United States Patent [19]

Snowdon et al.

[11] 4,070,592
[45] Jan. 24, 1978

[54] THREE STEP SEQUENCE MOTOR

[75] Inventors: Arthur E. Snowdon, Bristol; Albert Palmero, Wallingford, both of Conn.

[73] Assignee: The Superior Electric Company, Bristol, Conn.

[21] Appl. No.: 731,059

[22] Filed: Oct. 8, 1976

[51] Int. Cl.[2] .......................................... H02K 37/00
[52] U.S. Cl. .................................. 310/49 R; 310/266
[58] Field of Search ............... 310/49, 154, 266, 49 A, 310/112; 318/696, 685

[56] References Cited

U.S. PATENT DOCUMENTS

| 2,627,040 | 1/1953 | Hansen | 310/49 |
|---|---|---|---|
| 3,042,818 | 7/1962 | Busch | 310/49 |
| 3,456,138 | 7/1969 | Huber | 310/49 |
| 3,466,476 | 9/1969 | Snowdon | 310/49 |
| 3,469,124 | 9/1969 | Willcoy | 310/49 |
| 3,500,081 | 3/1970 | Drejza et al. | 310/49 |
| 3,519,859 | 7/1970 | Morreak et al. | 310/49 |
| 3,596,119 | 7/1971 | Goldmann | 310/49 |
| 3,750,151 | 7/1973 | Dill | 310/49 X |
| 3,760,207 | 9/1973 | Abraham et al. | 310/49 |

Primary Examiner—Donovan F. Duggan
Attorney, Agent, or Firm—Ernest M. Junkins

[57] ABSTRACT

A stepping motor for providing movement in accordance with a repeating three step sequence with the third step being effected by a permanent magnet field and with the other two steps being effected by sequential sole energization of a pair of windings. The third step position constitutes the deenergized rest position of the motor.

11 Claims, 4 Drawing Figures

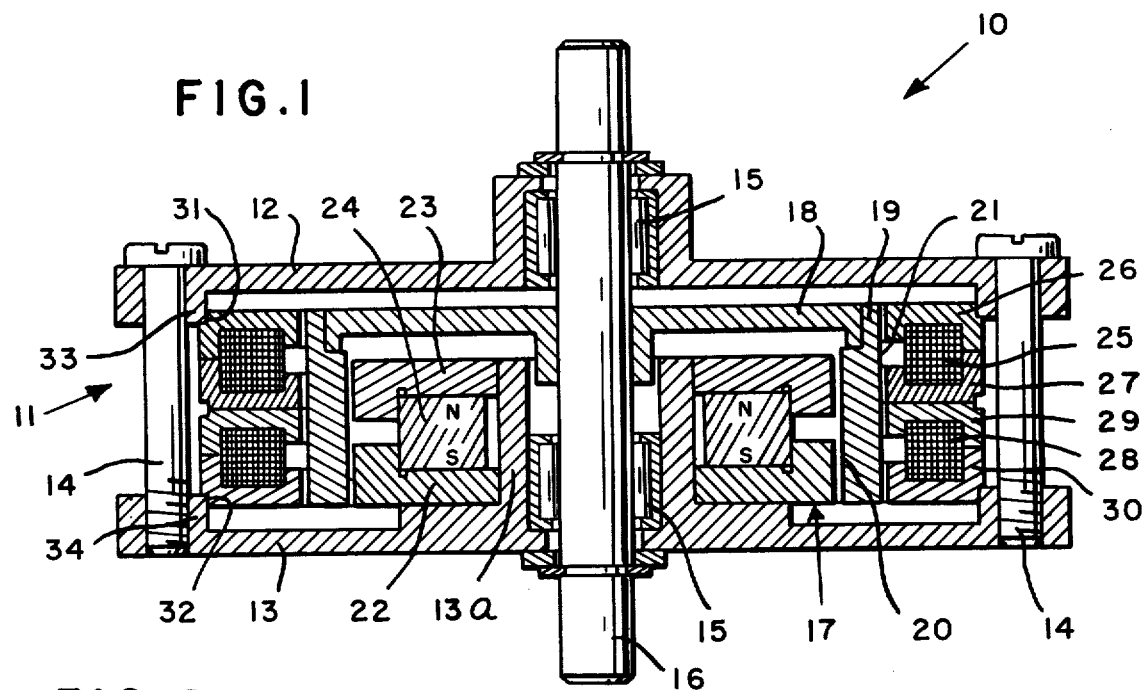
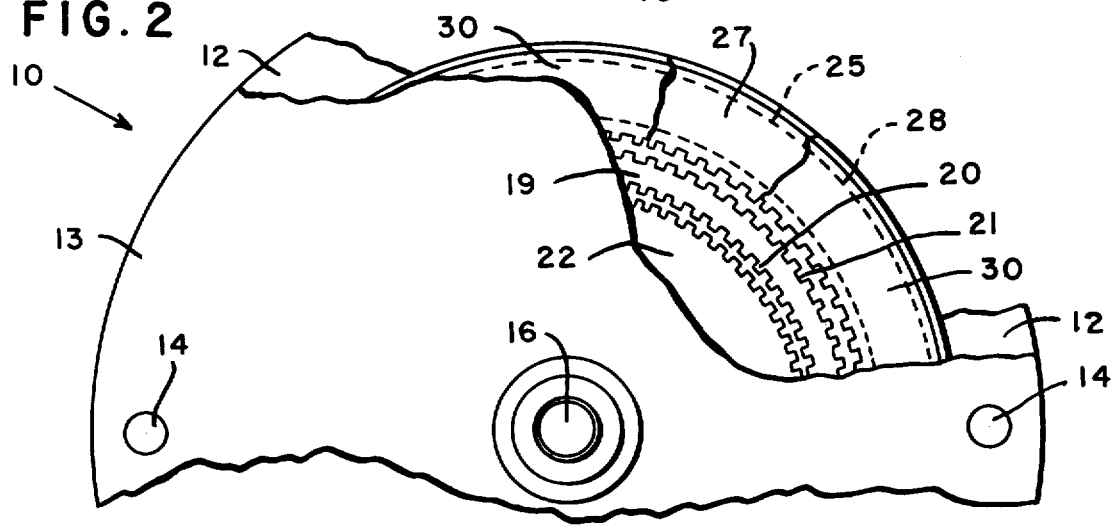
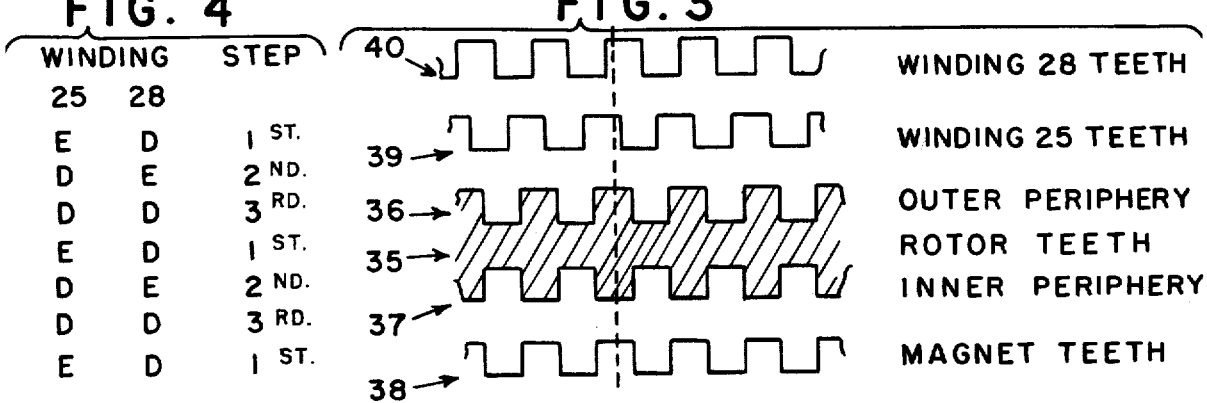

THREE STEP SEQUENCE MOTOR

The present invention relates to a stepping motor having two independently energizable windings and a permanent magnet for producing magnetic fields. The windings and magnet of the motor cooperate with a plurality of toothed elements so that the energization of only one winding produces a step-wise movement of the motor's rotor while energization of the other winding produces another sequential step. When both windings are de-energized, the motor is caused to produce its third step by the magnet. The motor has a plurality of circular toothed elements having an essentially common angular pitch which makes all steps essentially equal in extent and the sum of the three steps results in an angular rotational movement of the rotor that is essentially equal to the common angular tooth pitch.

In U.S. Pat. No. 2,627,040, there is disclosed a three step sequence stepping motor which produces a movement of one-third of a tooth pitch for each change of energization of its windings. While such a motor has a construction which produces essentially the same three step sequence movement as the present invention, it requires a different mode of winding energization from a power source to produce each step. Also, for the motor to be magnetically held at a rest position, the motor windings are required to be maintained energized in one of their modes of energization. Moreover, the construction of the motor inherently limits the extent of the magnetic fields to less than a complete circle about the rotor which would tend to limit the torque produced by the motor.

It is accordingly an object of the present invention to provide a motor having a three step sequence in which only two modes of energization from a power source are required for a three step sequence movement and yet in which the motor is capable of being energized to step in either direction.

Another object of the present invention is to achieve the above object with a three step sequence stepping motor in which the motor's rotor is continually urged to attain its third step or rest position in the sequence and in which the rotor assumes the rest position and is magnetically urged to remain thereat, even when the motor is de-energized.

A further object of the present invention is to achieve the above results with a stepping motor which is economical to manufacture, reliable in use, compact in size and produces substantial torque for its size and manner of operation.

In carrying out the present invention, the motor includes a stator that rotatably supports a rotor. The rotor is cup-shaped and has teeth formed on both its inner and outer peripheries. All teeth extend parallel to the rotor's axis, are equally spaced about the peripheries by having the same angular pitch and are radially aligned. The stator includes an outer portion having a first magnetic field producing means which includes an annular coil and annular rings associated therewith, the latter having inner peripheries formed with equally spaced, axially extending teeth. A second magnetic field producing means, having an identical construction to the first, is positioned adjacent thereto along the axis of the rotor but its teeth are rotatably displaced ⅓ of a tooth pitch from the teeth of the first means. The first and second field forming means cooperate with the teeth on the outer periphery of the rotor. The teeth on the inner periphery of the rotor cooperate with a third magnetic field producing means that includes a permanent magnet and two annular rings having teeth formed on the exterior periphery of each that also extend axially.

All the teeth of both the rotor and the stator have the same angular pitch but the teeth associated with the first field producing means are angularly displaced ⅓ of a tooth pitch in one direction from the teeth associated with the permanent magnet while the teeth associated with the second field forming means are displaced ⅓ of a tooth pitch in the other direction from the teeth associated with the permanent magnet.

With this motor construction, the permanent magnet continually urges the rotor to assume a position where the rotor teeth and the permanent magnet associated teeth are radially aligned to minimize the reluctance in its magnetic path. Upon energization of a field producing means, a magnetic field is produced which has a stronger rotational effect on the rotor than the field produced by the magnet and the rotor will react by moving into alignment with this field. As the field is angularly displaced ⅓ of a tooth pitch from the magnetic field, the rotor will thus move a step equal to ⅓ of a tooth pitch. Upon de-energization of this field producing means and simultaneous energization of the other field producing means, the rotor will react to assume a position in alignment with the other field by moving another ⅓ of a tooth pitch to have the rotor teeth become aligned with the teeth of the energized field producing means. Upon subsequent de-energization of the latter, without energization of the first field producing means so that the motor is thus not energized from a power source, the rotor will then move another ⅓ of a tooth pitch to its rest position where its teeth are aligned with the teeth associated with the permanent magnet.

The rotor thus assumes a known position in the three step sequence whenever the motor is de-energized and it is also magnetically held in such a position. In addition, the continuous urgings of the magnet magnetic field appears to act as a damper on the rotor movement, thereby decreasing the tendency of the rotor to oscillate at its stepping positions.

Other features and advantages will hereinafter appear.

Referring to the drawing —

FIG. 1 is an axial section of the motor of the present invention.

FIG. 2 is a partial end view of the motor with portions broken away.

FIG. 3 is a diagrammatic sketch of the relative disposition of the stator and rotor teeth when the rotor is at its rest position.

FIG. 4 is a chart of the energization sequence required for producing movement.

Referring to the drawing, the motor of the present invention is generally indicated by the reference numeral 10 and includes a stator 11 having a pair of end bells 12 and 13 that are clamped together as by screws 14. Each end bell includes a bearing 15 for rotatably supporting a shaft 16 of a rotor, generally indicated by the reference numeral 17.

The rotor includes a disc-like plate 18 secured on the shaft as by a force fit or adhesive, while secured to the outer periphery of the plate 18 is an essentially hollow cylindrical member 19 having an inner periphery 20 and outer periphery 21. Accordingly, any movement of the cylindrical member 19 is transmitted to the shaft 16 and constitutes the rotational output of the motor.

The end bell 13 includes a hub 13a whose exterior supports a pair of annular end caps 22 and 23 with a doughnut shaped permanent magnet 24, having the magnetic polarity shown, positioned therebetween. The end caps 22 and 23 are secured to the hub 13a and to the magnet 24 in any convenient manner as, for example, by an adhesive and/or force fit.

Cooperating with the outer periphery 21 of the cylindrical member 19 is a first magnetic field producing means consisting of an annular winding 25 and upper and lower toothed rings 26 and 27. Positioned adjacent thereto is a second field producing member having the same construction as the first and accordingly including an annular winding 28 and upper and lower toothed rings 29 and 30, respectively.

The upper ring 26 and the lower ring 30 are each provided with a peripheral notch 31 and 32, respectively, for mating with annular flanges 33 and 34 formed on the end bells 12 and 13. When the motor is assembled, the screws 14 clamp the rings in place through the flanges 33 and 34 and the notches 31 and 32 and they in turn secure the windings in the stator.

The rings 26, 27, 29 and 30 together with the end caps 22 and 23 are each formed with equally spaced teeth that extend towards the outer and inner peripheries of the cylindrical member 19 which also has teeth formed on both of its peripheries. All teeth on all of the elements extending radially have the same angular pitch with the valley of each tooth being preferably about $\frac{1}{2}$ of the tooth pitch. One tooth pitch that has been found desirable to produce a three step sequence is a tooth pitch of 3.75° which requires that 96 teeth be formed about the periphery of each of the toothed elements. With such a number of teeth, though the invention is not to be considered as limited thereto, each step produced by a change of energization of the motor will produce a step of essentially $\frac{1}{3}$ of a tooth pitch or 1.25° while a three step sequence will produce a movement of 3.75° of the rotor.

Shown in FIG. 3 is a representation showing the relative disposition of the teeth of the various elements when the rotor is at its rest position. The rotor teeth indicated by the reference numeral 35 has the teeth 36 formed on its outer periphery 21 radially aligned with teeth 37 formed on its inner periphery 29 and are denoted "rotor teeth", "outer periphery" and "inner periphery", respectively. The teeth formed on the end caps 22 and 23 are axially aligned, indicated by the numeral 38 and for convenience are denoted "magnet teeth" on the drawing even though the teeth are not formed directly on the magnet. Since the relative teeth position shown is the rest position, the magnet teeth 38 of the magnet end caps are radially aligned with the inner teeth 37 of the rotor.

The teeth of rings 26 and 27 associated with winding 25 are axially aligned, indicated by the numeral 39 and for convenience are denoted "winding 25 teeth" on the drawing. These teeth as shown, are angularly displaced $\frac{1}{3}$ of a tooth pitch rightwardly which may be considered as being clockwise in the motor with respect to the magnet teeth 38. The teeth of rings 29 and 30 are axially aligned with each other, are associated with the winding 28, and are indicated in FIG. 3 by the reference numeral 40. Also, for convenience, they are denoted by "winding 28 teeth." However, these teeth are displaced $\frac{1}{3}$ of a tooth pitch leftwardly or counterclockwise in the motor with respect to the magnet teeth 38. It will be understood that, by displacing the teeth 40 leftwardly and the teeth 39 rightwardly from the magnet teeth 38 each $\frac{1}{3}$ of a tooth pitch, the teeth 39 and 40 are thus also displaced $\frac{2}{3}$ of a tooth pitch from each other.

In the operation of the motor of the present invention, when power is not being provided to either winding 25 or 28, the rotor teeth 35 will assume a position where there is a minimum reluctance in the magnetic path between them and the magnet teeth 38 so that rotor teeth and magnet teeth will become radially aligned. If it is assumed that the rotor is to rotate clockwise, then the winding 25 is energized with direct current which produces a magnetic path through the teeth 39 which reacts with the rotor teeth 35 to cause the rotor to move a step clockwise where the rotor assumes a minimum reluctance position by the teeth 36 becoming essentially radially aligned with the teeth 39. For the next step, the winding 25 is de-energized and the winding 28 is energized, with the result that there is a magnetic path through the teeth 40 to which the rotor reacts by moving another step clockwise to have the teeth 36 become essentially aligned with the teeth 40. The next step in the three step sequence is produced by de-energizing the winding 28 while maintaining the winding 25 deenergized so that the rotor will react with the magnet magnetic field to have the teeth 37 become aligned with the teeth 38 which is the position they assume at the rest position of the rotor. The rotor will be maintained at this position so long as neither winding is energized. If the sequence were reversed so that the winding 28 was energized for the first step and the winding 25 for the second step, the rotor would step counterclockwise.

The sequence above referred to is shown in FIG. 4 where the letter "D" represents a de-energized state of a winding and the letter "E," an energized state.

It will be understood that the windings 25 and 28 have sufficient turns and are capable of carrying a sufficient current to produce a magnetic field which results in a stronger reaction with the rotor than the reaction obtained by the magnetic field of the permanent magnet 24. Whenever a winding is energized, the rotor reacts to both the winding field and the magnet field and thus will assume a location where there is a balance between the reactions produced by these fields. If the winding associated teeth are exactly one-third a tooth pitch from each other and the magnet associated teeth, then exact alignment of the rotor teeth will only occur when the winding field reaction is so strong that it completely nullifies the magnet field reaction. As a satisfactory minimum, the winding field has to be sufficiently strong to produce a reaction about double the magnet field reaction to assure movement of the rotor away from alignment with the magnet associated teeth at an acceptable velocity. However, with the minimum winding field and other than the maximum above referred to, the magnet field reaction is not nullified and hence exact alignment between the rotor teeth and the winding associated teeth will not occur. If exact alignment is desired, then the winding associated teeth may be shifted somewhat from the exactly one-third of a tooth pitch displacement.

Accordingly, as used herein, the term "alignment" is to include approximate alignment of the rotor and winding associated teeth and the displacement or movement of one-third of a tooth pitch to include a displacement or movement of aporoximately said extent.

It has been found that with the construction shown many parts of the motor may be economically formed as unitary pieces from sintered iron, especially the rings 22, 23, 26, 27, 29 and 30. Further the rings 26 and 29 and 27 and 30 are made to be identical to reduce the number of unique parts of the motor.

It is considered to be within the scope of the invention invention to substitute a continuously energized electromagnet for the permanent magnet in order to produce the permanent magnetic field. Such a change would merely require the substitution of a winding wound similar to windings 25 and 28 and connections to a continuous D.C. source.

It will accordingly be understood that there has been disclosed a stepping motor which produces movement in either direction in accordance with a repeating three step sequence. The motor is continually urged to assume the same position in the sequence whenever it is deenergized and this urging provides the third step of the sequence. The other two steps are produced by sequential energization of one and then the other of two windings with there only being one winding energized at a time. The magnetic field produced by an energized winding produces a reaction on the rotor which overcomes the reaction urged by the magnet field. However, the continual urging of the magnet field has been found to act as a damper, tending to reduce the tendency of the rotor to oscillate at the step positions.

Variations and modifications may be made within the scope of the claims and portions of the improvements may be used without others.

We claim:

1. A motor for producing a plurality of incremental steps of essentially equal extent in each revolution in accordance with a repeating three step sequence comprising a stator and a rotor rotatably supported by the stator; said stator having a first energizable means and a second energizable means, each of said energizable means providing when energized a magnetic field with the magnetic field produced by the second means being rotatably displaced one step from the magnetic field of the first means, a third magnetic field producing means for producing a continuous magnetic field rotatably displaced one step from the fields of the first and second energizable means; said rotor being positioned for reaction to all magnetic fields and having means for causing it to assume a rotatable position of minimum reluctance where it is rotatably in alignment with the strongest one of said magnetic fields; and means for sequentially solely energizing the first and second energizable means to each produce a step of the motor and for maintaining both energizable means de-energized to produce a third step.

2. The invention as defined in claim 1 in which the third means includes a permanent magnet and in which the first and second energizable means produces a nonresidual magnetic field only when energized.

3. The invention as defined in claim 2 in which the first means is energized to produce a rotor reaction greater than the reaction produced by the third means and in which the second means is energized to produce a rotor reaction greater than the reaction produced by the third means.

4. The invention as defined in claim 1 in which the magnetic field produced by each of the three means completely encircles the rotor.

5. A motor for producing a plurality of incremental steps of essentially equal extent in each revolution in accordance with a repeating three step sequence comprising a stator and a rotor rotatably supported by the stator; said stator having a first magnetic field producing means comprising a first winding and an interiorly toothed annular means, a second field producing means comprising a second winding and a second interiorly toothed annular means, a third magnetic field producing means comprising a source of continuous magnetism and externally toothed annular means, means for locating each of said field means to locate its magnetic field one step away from each of the others; and in which said rotor has a shaft rotatably mounted by the stator and an annular member having an exteriorly toothed periphery and an interiorly toothed periphery mounted on the shaft; and means for sequentially independently energizing the first winding or the second winding and for maintaining both windings de-energized to produce a three step sequence movement.

6. The invention as defined in claim 5 in which each winding consists of an annular coil, in which each interiorly toothed annular means consists of a pair of rings and in which each coil is positioned between its pair of annular rings.

7. The invention as defined in claim 5 in which the third means includes a permanent magnet which is annular and magnetically polarized parallel with the axis of the shaft, in which the exteriorly toothed annular means consists of a pair of rings and in which the magnet is positioned between the rings.

8. The invention as defined in claim 5 in which the teeth of both of the interiorly toothed means, the teeth of the exteriorly toothed means, and the teeth on both peripheries of the annular member all have the same circular pitch.

9. The invention as defined in claim 8 in which the means for positioning includes means for locating the teeth of each field means essentially one-third of a tooth pitch from each other, whereby a step has an extent of one-third of a tooth pitch.

10. The invention as defined in claim 5 in which both of the interiorly toothed annular means and the exteriorly toothed means each consists of one pair of annular rings and in which each ring is formed as a unitary piece of sintered iron.

11. A motor for producing a plurality of incremental steps of essentially equal extent in each revolution in accordance with a repeating plural step sequence comprising a stator and a rotor rotatably supported by the stator; said stator having a plurality of magnetic field producing means with there being one magnetic field producing means for each step of the sequence, one of said field producing means comprising a source of continuous magnetism and externally toothed annular means, each of the remainder of said field producing means including a winding and an exteriorly toothed annular means, means for locating each of said field means to locate its magnetic field essentially one step away from each of the others; and in which said motor has a shaft rotatably mounted by the stator and an annular member having an exteriorly toothed periphery and an interiorly toothed periphery mounted on the shaft; and means for independently energizing each of the windings sequentially and for maintaining all windings de-energized to produce a plural step sequence movement.

* * * * *